(12) United States Patent
Benedictus et al.

(10) Patent No.: US 6,994,760 B2
(45) Date of Patent: Feb. 7, 2006

(54) METHOD OF PRODUCING A HIGH STRENGTH BALANCED AL-MG-SI ALLOY AND A WELDABLE PRODUCT OF THAT ALLOY

(75) Inventors: Rinze Benedictus, Delft (NL); Christian Joachim Keidel, Montabaur (DE); Guido Weber, Andernach (DE); Alfred Johann Peter Haszler, Vallendar (DE)

(73) Assignee: Corus Aluminium Walzprodukte GmbH, Koblenz (DE)

( * ) Notice: Subject to any disclaimer, the term of this patent is extended or adjusted under 35 U.S.C. 154(b) by 20 days.

(21) Appl. No.: 10/449,719

(22) Filed: Jun. 2, 2003

(65) Prior Publication Data

US 2004/0062946 A1 Apr. 1, 2004

(30) Foreign Application Priority Data

Jun. 24, 2002 (EP) ................................. 02077546

(51) Int. Cl.
*C22F 1/05* (2006.01)

(52) U.S. Cl. ..................... 148/552; 148/693; 148/694; 148/700

(58) Field of Classification Search ................ 148/552, 148/693, 694, 700
See application file for complete search history.

(56) References Cited

U.S. PATENT DOCUMENTS

| | | | |
|---|---|---|---|
| 4,589,932 A * | 5/1986 | Park ........................... | 148/690 |
| 5,560,789 A | 10/1996 | Sainfort et al. | |
| 5,607,524 A | 3/1997 | Klemp et al. | |
| 5,858,134 A | 1/1999 | Bechet et al. | |
| 5,888,320 A | 3/1999 | Dorward | |
| 6,334,916 B1 | 1/2002 | Matsumoto et al. | |
| 6,528,183 B2 * | 3/2003 | Dif et al. ..................... | 428/654 |
| 2002/0014290 A1 | 2/2002 | Dif et al. | |

FOREIGN PATENT DOCUMENTS

| | | |
|---|---|---|
| EP | 0173632 | 3/1986 |
| EP | 1029937 | 8/2000 |
| EP | 1143027 | 10/2001 |
| EP | 1170118 | 1/2002 |

OTHER PUBLICATIONS

"Aluminum and Aluminum Alloys" ASM Internaitonal, 1993, pp 22-23,45.*

* cited by examiner

*Primary Examiner*—George Wyszomierski
*Assistant Examiner*—Janelle Morillo
(74) *Attorney, Agent, or Firm*—Stevens, Davis, Miller & Mosher, LLP

(57) ABSTRACT

The present invention relates to a method for producing high strength balanced Al—Mg—Si alloy with an improved fatigue crack growth resistance and a low amount of intermetallics, comprising the steps of
a) casting an ingot with the following composition (in weight percent) Si: 0.75–1.3, Cu: 0.6–1.1, Mn: 0.2–0.8, Mg: 0.45–0.95, Fe: 0.01–0.3, Zr: <0.25, Cr: <0.25, Zn: <0.35, Ti: <0.25, impurities each less than 0.05 and less than 0.20 in total, balance aluminum,
b) optional homogenization of the cast ingot,
c) pre-heating the ingot after casting for 4 to 30 hours with temperatures above 520° C.,
d) hot working the ingot and optionally cold working,
e) solution heat treating, and
f) quenching the worked product.

The pre-heating is preferably performed for 6 to 18 hours with temperatures between 530° C. and 560° C. The alloy has a fatigue crack growth rate at $\Delta K=20$ MPa$\sqrt{m}$ of below 9.0E–04 and at $\Delta K=40$ MPa$\sqrt{m}$ of below 9.0E–03, wherein the amount of intermetallics within the finally worked alloy product, according to the measured specific energy Delta H associated with the DSC signal, is below 1.5 J/g.

35 Claims, 2 Drawing Sheets

METHOD OF PRODUCING A HIGH STRENGTH BALANCED AL-MG-SI ALLOY AND A WELDABLE PRODUCT OF THAT ALLOY

FIELD OF THE INVENTION

The present invention relates to a method of producing high strength balanced Al—Mg—Si alloy product with an improved fatigue crack growth resistance and a low amount of intermetallics, a weldable product of high strength balanced Al—Mg—Si alloy and an aircraft skin material produced from that alloy. More specifically, the present invention relates to a high strength Al—Mg—Si alloy designated by the 6000 series of the international nomenclature of the Aluminum Association for structural aeronautical applications.

BACKGROUND OF THE INVENTION

It is known in the art to use heat treatable aluminum alloys in a number of applications involving relatively high strength such as aircraft fuselages, vehicular members and other applications. Aluminum alloys 6061 and 6063 are well known heat-treatable aluminum alloys. These alloys have useful strength and toughness properties in both T4 and T6 tempers. As is known, a T4 condition refers to a solution heat treated and quenched condition naturally aged to a substantially stable property level, whereas a T6 temper refers to a stronger condition produced by artificially ageing. These known aluminum alloys lack, however, sufficient strength for most structural aerospace applications.

Several other AA6000 series alloys are generally unsuitable for the design of commercial aircraft which require different sets of properties for different types of structures. Depending on the design criteria for a particular airplane component, even small improvements in strength, fracture toughness and fatigue resistance result in weight savings, which translate to fuel economy over the lifetime of the aircraft, and/or a greater level of safety. To meet these demands several other 6000 series alloys have been developed.

European patent application EP-A-0173632 concerns extruded or forged products of an alloy consisting of the following alloying elements, in wt. %:

| | |
|---|---|
| Si | 0.9–1.3, preferably 1.0–1.15 |
| Mg | 0.7–1.1, preferably 0.8–1.0 |
| Cu | 0.3–1.1, preferably 0.8–1.0 |
| Mn | 0.5–0.7 |
| Zr | 0.07–0.2, preferably 0.08–0.12 |
| Fe | <0.30 |
| Zn | 0.1–0.7, preferably 0.3–0.6 | balance aluminum and unavoidable impurities (each <0.05, total <0.15).

The products have a non-recrystallised microstructure. This aluminum alloy has been registered under the AA designation 6056.

European patent application EP-A-0173632 concerns extruded or forged products of an alloy consisting of the following alloying elements, in wt. %:

It has been reported by that this known AA6056 alloy is sensitive to intercrystalline corrosion in the T6 temper condition. In order to overcome this problem U.S. Pat. No. 5,858,134 provides a process for the production of rolled or extruded products having the following composition, in wt. %:

| | |
|---|---|
| Si | 0.7–1.3 |
| Mg | 0.6–1.1 |
| Cu | 0.5–1.1 |
| Mn | 0.3–0.8 |
| Zr | <0.20 |
| Fe | <0.30 |
| Zn | <1 |
| Ag | <1 |
| Cr | <0.25 | other elements <0.05, total <0.15
balance aluminum, and whereby the products are brought in an over-aged temper condition requiring time and money consuming processing times at the end of the manufacturer of aerospace components. In order to obtain the improved intercrystalline corrosion resistance it is essential for this process that in the aluminum alloy the Mg/Si ratio is less than 1.

U.S. Pat. No. 4,589,932 discloses an aluminum wrought alloy product for e.g. automotive and aerospace constructions, which alloy was subsequently registered under the AA designation 6013, having the following composition, in wt. %:

| | |
|---|---|
| Si | 0.4–1.2, preferably 0.6–1.0 |
| Mg | 0.5–1.3, preferably 0.7–1.2 |
| Cu | 0.6–1.1 |
| Mn | 0.1–1.0, preferably 0.2–0.8 |
| Fe | <0.6 |
| Cr | <0.10 |
| Ti | <0.10 | the balance aluminum and unavoidable impurities.

The aluminum alloy has the mandatory proviso that [Si+0.1] <Mg<[Si+0.4], and has been solution heat treated at a temperature in a range of 549 to 582° C. and approaching the solidus temperature of the alloy. In the examples illustrating the patent the ratio Mg/Si is always more than 1.

U.S. Pat. No. 5,888,320 discloses a method of producing an aluminum alloy product. The alloy product has a composition of, in wt. %:

| | |
|---|---|
| Si | 0.6–1.4, preferably 0.7–1.0 |
| Fe | <0.5, preferably < 0.3 |
| Cu | <0.6, preferably < 0.5 |
| Mg | 0.6–1.4, preferably 0.8–1.1 |
| Zn | 0.4 to 1.4, preferably 0.5–0.8 | at least one element selected from the group:
Mn 0.2–0.8, preferably 0.3–0.5
Cr 0.05–0.3, preferably 0.1–0.2
balance aluminum and unavoidable impurities.

The disclosed aluminum alloy provides an alternative for the known high-copper containing 6013 alloy, and whereby a low-copper level is present in the alloy and the zinc level has been increased to above 0.4 wt. % and which is preferably in a range of 0.5 to 0.8 wt. %. The higher zinc content is reported to be required to compensate for the loss of copper.

European patent application EP-1143027 discloses a method for producing an Al—Mg—Si alloy of the 6000 series having a composition of, in wt. %:

| | |
|---|---|
| Si | 0.7–1.3 |
| Mg | 0.6–1.1 |
| Cu | 0.5–1.1 |
| Mn | 0.3–0.8 |
| Zn | <1 |
| Fe | <0.3 |
| Zr | <0.2 |
| Cr | <0.25 | other elements <0.05, total <0.15
balance aluminum, wherein the products are subjected to an artificial ageing procedure to improve the alloy and to meet high damage tolerance ("HDT") characteristics similar to those of the AA2024 series which are preferably used for aeronautical applications but which are not weldable. The ageing procedure is optimized by using a respective function of the chemistry.

European patent application EP-1170118-A1 discloses an aluminum alloy similar to the one described in EP-1143027 wherein an aluminum alloy sheet for aeronautical applications is clad on one or both surfaces in order to improve the corrosion resistance. The core sheet in AA6000 series alloy is clad with a cladding sheet in an alloy of Al—Zn type. Those clad sheets, which may be used to manufacturer aircraft structural parts, do have the advantage that they are resistant to corrosion and have improved static mechanical properties. It is also described to homogenize the core material before applying the cladding within a temperature range of between 530° C. and 575° C. for a period of between 1 and 8 hours.

U.S. Pat. No. 5,607,524 discloses a method for making an aluminum drive shaft for automobiles or trucks from aluminum alloy tube. The aluminum alloy covers a very broad range of 6000-series alloys. The tube is being made by extrusion within a temperature range of about 260 to 426° C.

EP-1029937-A1 discloses an Al—Mg—Si alloy sheet with improved press-formability over conventional Al—Mg—Si based alloy sheets by controlling the orientation density of at least the Cube orientation. The material is suitable for an engine hood or trunk hood of an automobile.

Even though the alloys of the AA6000 series have the general advantage of being weldable the high copper content, however, is detrimental with regard to the corrosion resistance even though copper enhances the strength of the aluminum alloy. Especially for designing structural parts for aeronautical applications improvements in fatigue crack growth resistance and low amount of intermetallics result in better properties and in weight savings which translate to fuel economy over the lifetime of the aircraft or to a greater level of safety.

SUMMARY OF THE INVENTION

It is therefore the object of the present invention to provide an improved high damage tolerant ("HDT") 6000 series aluminum alloy with balanced properties with regard to the fatigue crack growth resistance, corrosion resistance and improved strength and toughness. The alloy should be weldable and have at the same time properties similar to the AA2024 series. The HDT properties should be better than the AA2024-T3 alloy and preferably better than AA2524-T3.

More specifically, there is a general requirement for rolled AA6000-series aluminum alloys within the range of 6013-series and 6056-series alloys when used for aerospace applications that the fatigue crack growth rate ("FCGR") should not be greater than a defined maximum. A FCGR which meets the requirements of high damaged tolerance 2024-series alloy products is e.g. FCGR below 0.001 mm/cycles at $\Delta K=20$ MPa$\sqrt{m}$ and 0.01 mm/cycles at $\Delta K=40$ MPa$\sqrt{m}$.

It is yet a further object of the present invention to provide a weldable product of high strength balanced Al—Mg—Si alloy for use to construct structural parts in the aircraft industry as well as to provide an aircraft skin material produced from such alloy.

The present invention solves the above-mentioned objects by the features of independent claims. Preferred embodiments are characterized within the sub-claims wherein an aircraft skin material produced from the alloy according to the invention is specified.

DETAILED DESCRIPTION OF THE PREFERRED EMBODIMENTS

The present invention provides a method for producing high strength balanced Al—Mg—Si alloy with an improved fatigue crack growth resistance and a low amount of intermetallics, comprising the steps of:

a) casting an ingot with the following composition (in weight percent):

| | |
|---|---|
| Si: | 0.75–1.3 |
| Cu: | 0.6–1.1 |
| Mn: | 0.2–0.8 |
| Mg: | 0.45–0.95 |
| Fe: | 0.01–0.3 |
| Zr: | <0.25 |
| Cr: | <0.25 |
| Zn: | <0.35 |
| Ti: | <0.25 |
| V: | <0.25 |
| Hf: | <0.25 | impurities each less than 0.05 and less than 0.20 in total, balance aluminum, b) Optionally homogenization of the ingot after casting,
c) pre-heating the cast ingot for 4 to 30 hours at temperatures above 520° C.,
d) hot working the ingot, preferably by means of rolling, and optionally cold working, preferably by means of rolling,
e) solution heat treating, and
f) quenching the worked product.

The pre-heating step c) is preferably performed for 6 to 18 hours with temperatures in a range between 530° C. and 560° C., preferably at about 550° C., specifically for 6 to 12 hours. Furthermore, it is advantageous to also homogenize the ingot before the pre-heating step c) and after the casting step a) with a temperature range below 530° C., preferably at about 510° C.

Furthermore, the chemistry of the alloy can be further improved by tuning the balance (in weight-%) of Mn with regard to the amounts of Cu and Mg, such as [Cu]>1.8[Mn], preferably [Cu]>2.25[Mn], and/or [Mg]>2.0[Mn], preferably [Mg]>2.2[Mn].

Throughout the step of pre-heating and an improved balanced chemistry the product obtained has a specific microstructural composition which is defined by way of the differential scanning calorimetry ("DSC") where the amount of the low melting incipient phases (=intermetallics, melting at lower temperatures) can be measured by determining the specific energy Delta associated with such method. Such differential scanning calorimetry is described within U.S. Pat. No. 5,560,789 which defines the quality of the alloy by the amount of solvable or unsolvable intermetallics within or in between the grain boundaries and which are detrimental with regard to the qualities of the obtained alloy.

Homogenization is a heat treatment to homogenize/improve the as-cast structure. With a homogenization treatment it is possible to at least partially remove or reduce as-cast imperfections, like low melting phases, thereby achieving a more homogeneous distribution of the elements (for AA6xxx, this is Mg, Si and Cu). Preferably, the homogenization treatment does include a heating trajectory and a soak and a cooling trajectory down to room temperature, or at least below 100° C. The controlled heating trajectory is very important to also remove the low melting phases by dissolving or transforming of the phases at a lower temperature then the melting phase. The time and temperature of the soak is important for the homogeneous distribution of the elements, i.e. they need sufficient time to diffuse through the matrix.

Pre-heat is the heating of the ingot, so that a homogeneous temperature is reached within the whole rolling block or ingot. The pre-heat does include a heating trajectory and a soak. The soak is necessary to get a homogeneous temperature in the ingot. Surprisingly, it has been found, according to the invention, that the pre-heat step is important and enhances the da/dN, that is the fatigue crack growth resistance ("FCGR").

According to an embodiment of the invention, homogenization and preheat are combined. During the cooling of the homogenization cycle, the ingot is cooled down to the pre-heat or hot rolling temperature and then immediately hot rolled.

According to the present invention the high-strength balanced Al—Mg—Si alloy has an amount of (low melting) intermetallics which is—according to the measured specific energy Delta H associated with the DSC signal—below 1.5 J/g, preferably below 1.0 J/g, even more preferably below 0.65 J/g.

The balance of high formability, good fracture toughness and fatigue crack growth properties, high strength, and good corrosion resistance properties of the weldable aluminum alloy of the present invention are dependent upon the chemical composition that is closely controlled within specific limits as set forth below in more detail. In accordance with the invention it has been found that the described balance of properties may be further optimized by the described processing route of the alloy product. All composition percentages are by weight percent.

A preferred range for the silicon content is from 0.8 to 1.1% to optimize the strength of the alloy product in combination with magnesium. A too high Si content has a detrimental influence in particular on the elongation in the T6 temper and on the corrosion performance of the alloy product. A too low Si content does not provide sufficient strength to the alloy. A more preferred range for the silicon content is from 0.79 to 0.92%.

Magnesium in combination with the silicon provides strength to the alloy product. The preferred range of magnesium is 0.60 to 0.90%. At least 0.45% magnesium is needed to provide sufficient strength while amounts in excess of 0.95% make it difficult to dissolve enough solute to obtain sufficient age hardening precipitate to provide high T6 tensile strength. A more preferred range for the magnesium content is from 0.70 to 0.80%.

Copper is an important element for adding strength to the alloy. However, too high copper levels have a detrimental influence of the corrosion performance and on the weldability of the alloy product. The preferred copper content is in the range of 0.7 to 1.0%, and more preferably 0.75 to 0.90%, as a compromise in strength, toughness, formability and corrosion performance, while still resulting in sufficient damage tolerance properties.

The preferred range of manganese is 0.20 to 0.60%, and more preferably in the range of 0.30 to 0.40%. Mn contributes to or aids in grain size control during operations that can cause the alloy microstructure to recrystallise. These preferred levels of Mn are lower than those conventionally used in the known AA6056 alloy, while still resulting in sufficient strength and improved damage tolerance properties. In order to optimize the required balance of properties, preferably the chemical composition of the alloy product also meets the proviso that [Cu]>1.8[Mn], preferably [Cu]>2.25[Mn] and/or [Mg]>2.0[Mn], preferably [Mg]>2.2[Mn].

The zinc content in the alloy according to the invention should be less than 0.35%, and preferably less than 0.2%. It has been reported that the addition of zinc may add to the strength of the aluminum alloy, but in accordance with the invention it has been found that too high zinc contents have a detrimental effect of the intergranular corrosion performance of the alloy product. Furthermore, the addition of zinc tends to produce an alloy product having undesirable higher density, which is in particular disadvantageous when the alloy product is being applied for aerospace applications. However, if the alloy product is clad, more zinc may be used within the core layer to obtain more strength.

Iron is an element having an influence on the formability and on the fracture toughness of the alloy product. The iron content should be in the range of 0.01 to 0.3%, and preferably 0.01 to 0.25%, and more preferably 0.01 to 0.20%.

Titanium is an important element as a grain refiner during solidification of the ingots, and should preferably be less than 0.25%. In accordance with the invention it has been found that the corrosion performance, in particular against intergranular corrosion, can be remarkably be improved by having a Ti-content in the range of 0.06 to 0.20%, and preferably 0.07 to 0.16%.

Zirconium and/or chromium and/or vanadium and/or hafnium may be added to the alloy each in an amount of less than 0.25% to improve the recrystallisation behavior and/or the corrosion performance ("ICG") of the alloy. With the addition of Zr/Cr more elongated grains may be obtained.

The balance is aluminum and inevitable impurities. Typically each impurity element is present at 0.05% maximum and the total of impurities is 0.20% maximum.

The best results are achieved when the alloy rolled products have a recrystallised microstructure, meaning that 70% or more, and preferably 80% or more of the grains in a T4 or T6 temper are recrystallised.

The alloy product according to the invention is preferably therein characterized that the alloy having been aged to a T6 temper in an ageing cycle which comprises exposure to temperature of between 150 and 210° C. for a period between 1 and 20 hours, thereby producing an alloy product having a yield strength of 335 MPa or more, and preferably of 345 MPa or more, and a tensile strength of 355 MPa or more, and preferably of 365 MPa or more.

The artificial ageing procedure is preferably performed after quenching the worked product wherein temperatures are used of approximately 160° C. to 200° C. for 1 to 16 hours, preferably by being subjected to a T62 temper condition with about 190° C. for about 4 hours.

The weldable product according to the present invention consists of a high strength balanced Al—Mg—Si alloy with an improved fatigue crack growth resistance and a low amount of intermetallics having the aforementioned composition and a fatigue crack growth rate at $\Delta K=20$ MPa$\sqrt{m}$ is below 9.0E–04 and at $\Delta K=40$ MPa$\sqrt{m}$ is below 9.0E–03, and wherein the amount of intermetallics or low melting incipient phases within the finally worked alloy product, according to the measured specific energy Delta H associated with the DSC signal, is below 1.5 J/g. For obtaining the DSC parameters, a Pyris 1, Power Compensating Scanning Calorimeter apparatus may be used. The samples are then put in a graphite samples holder and measured in a protective nitrogen atmosphere. The heating rate is then 20° C./min, the maximum temperature used is below the melting temperature of the alloy, thus up to about 550° C. The data may be acquired with the Pyris Series Thermal Analysis Manager, V 3.81.

The alloy product is a "finally worked alloy" product after the solution heat treating and quenching steps of the present invention which occur after the hot working and optional cold working.

The alloy product according to the present invention has an Mg/Si-ratio in a range between 0.8 and 1.375 wherein the contents of the Si/Mg-ratio and Cu amount (in weight %) is balanced. The alloy product may therefore be successfully welded using techniques like e.g. laser beam welding, friction-stir welding and TIG welding. In order to further optimize the required balance of properties preferably the chemical composition of the alloy product also meets the proviso that [Si]>[Cu]>[Mg] or [Si]<[Cu]<[Mg], preferably a balance of ([Si]±[Mg])/2=[Cu]0.1, preferably [Cu]±0.05, most preferably [Cu]±0.02.

In a preferred embodiment of the invention the alloy product of this invention may be provided with at least one cladding. Such clad products utilize a core of the aluminum base alloy product of the invention and a cladding of usually higher purity, which in particular corrosion protects the core. The cladding includes, but is not limited to, essentially unalloyed aluminum or aluminum containing not more than 0.1 or 1.0% of all other elements. Also, a sacrificial Al-alloy with an electrochemical potential which is lower than that of the core layer or a protective Al-alloy with an electrochemical potential which is higher than that of the core layer may be used.

Aluminum alloys herein designated 1xxx-type series include all Aluminum Association ("AA") alloys, including the sub-classes of the 1000-type, 1100-type, 1200-type and 1300-type. Thus, the cladding on the core may be selected from various Aluminum Association alloys such as 1060, 1045, 1100, 1200, 1230, 1135, 1235, 1435, 1145, 1345, 1285, 1188, or 1199. In addition, alloys of the AA7000-series alloys, such as 7072 containing zinc (0.8 to 1.3%), can serve as the cladding and alloys of the AA6000-series alloys, such as 6003 or 6253, which contain typically more than 1% of alloying additions, can serve as cladding, also. Other alloys could also be useful as cladding as long as they provide in particular sufficient overall corrosion protection to the core alloy.

In addition a cladding of the AA4000-series alloys can serve as cladding, also. The AA4000-series alloys have as main alloying element silicon typically in the range of 6 to 14%. In this embodiment the cladding layer provides the welding filler material in a welding operation, e.g. by means of laser beam welding, and thereby overcoming the need for the use of additional filler wire materials in a welding operation. In this embodiment the silicon content is preferably in a range of 10 to 12%.

The cladding layers are usually much thinner than the core, each constituting 2 to 15 or 20 or possibly 25% of the total composite thickness. A cladding layer more typically constitutes around 2 to 12% of the total composite thickness.

In a preferred embodiment the alloy product according to the invention is being provided with a cladding thereon on one side of the AA1000-series and on the other side thereon of the AA4000-series.

The main reason for using a cladding is to enhance the corrosion resistance of the whole product. Generally, there are two different approaches possible with cladding:
a) the cladding is more noble than the core (and thus protective), the electrochemical potential is higher (less negative) than that of the core layer; or
b) the cladding is less noble than the core (and thus sacrificial), the electrochemical potential is lower than that of the core layer.

Approach b) is preferred. Although good corrosion behavior of the cladding itself is preferred (it will enhance the life time), it is not necessary. When the cladding is penetrated by corrosion or other damage, the cladding will remain sacrificial to the core, and thus the core is still protected.

For both approaches, there needs to be a corrosion potential difference between the cladding and the core. According to general knowledge, this should be around 60 mV to 130 mV, preferably 100 mV or higher. It is also known to change the corrosion potential of an alloy by adding certain elements (e.g. Cu makes it more noble, whereas Zn makes it less noble).

For some alloy products of the invention it is possible to apply dissimilar cladding on either sides, or that the product is only single side clad.

The following claddings for products of the invention are feasible.
1) A sheet with a clad on both sides,
2) A sheet with a clad at least on one side,
3) A sheet where a different clad alloy is used on both sides,
4) A sheet where the cladding is made of an aluminum alloy,
5) A sheet where more than one or more clad alloys are used for one or both sides (multiclad type approach for aerospace),
6) A sheet where the difference in corrosion potential between the cladding and core alloy is at least 30 mV, preferable 50 mV or more,
7) A sheet where the difference in corrosion potential between the cladding and core alloy is between 30 to 180 mV, preferable between 50 to 120 mV,
8) A sheet where the cladding is/are made of an AA1xxx, AA2xxx, AA3xxx, AA4xxx, AA5xxx, AA6xxx, AA7xxx or AA8xxx,
9) A sheet where the cladding alloy is an AA-registered alloy with at least one element outside the AA-window, or adding of additional elements, to further improve the corrosion performance (e.g. Zn, Mn, Cu, Si), preferable such that the corrosion potential difference is between 30 to 180 mV, preferable 50 to 120 mV, or 10) A sheet where on the one side a clad is used to improve corrosion resistance and on the other side clad is used to improve weldability or performance after welding.

Furthermore, the invention concerns an aircraft skin material produced from such high strength balanced Al—Mg—Si alloy manufactured by a method as described above. It has been found surprisingly that the pre-heating step c) results in an improved fatigue crack growth resistance of the rolled alloy product as compared to the conventional homogenization treatment in combination with a pre-heat treatment prior to the hot rolling operation. Furthermore, it has been found that a homogenization treatment with temperatures of 530° C. or below with a soaking time of 6 hours or less results in improved intergranular corrosion resistance yield strength and notch toughness. Hence, the aircraft skin material is preferably suitable as an aircraft fuselages skin material and may have a thickness of up to 15 mm, and preferably between up to 12–15 mm.

The homogenization has a different effect on the properties than the pre-heating step. The results of the invention, as described in detail below, show that the high-temperature pre-heat is necessary for acceptable strength levels (greater than 350 MPa for Rp). An optimum for pre-heating has been found around 8–10 hours at approximately 550° C. Furthermore it was found that the homogenization should not be too long in time or temperature, especially below 530° C. If the pre-heating step is too low in temperature or the homogenization is too long in time or too high in temperature, the properties are decreasing and getting unacceptable.

BRIEF DESCRIPTION OF THE DRAWINGS

The foregoing and other features and advantages of the alloys according to the invention will become readily apparent from the following detailed description of examples of preferred embodiments. These are illustrated in FIG. 1 to FIG. 4, all showing enlarged pictures of the aluminum alloys according to Table 1 after being subjected to an intergranular corrosion test.

EXAMPLES

Figure 1:

On an industrial scale four different aluminum alloys have been cast into ingots having the following chemical composition as set out in Table 1.

TABLE 1

Chemical composition of the DC-cast aluminum alloys, in weight percent, Zn = 0.01, Ti = 0.03, balance aluminum and inevitable impurities.

| Alloy | Alloying element | | | | | | |
|---|---|---|---|---|---|---|---|
| | Si | Fe | Cu | Mg | Mn | Cu/Mn | Mg/Mn |
| 1 | 0.91 | 0.12 | 0.82 | 0.77 | 0.34 | 2.41 | 2.26 |
| 2 | 0.79 | 0.11 | 0.86 | 0.93 | 0.34 | 2.53 | 2.74 |
| 3 | 0.92 | 0.15 | 0.90 | 0.88 | 0.54 | 1.67 | 1.63 |
| 4 | 0.79 | 0.17 | 0.86 | 0.95 | 0.44 | 1.95 | 2.16 |

Blocks of 10×10 cm have been sawn from the ingot slices, hot-rolled to a thickness of 9.0 mm and cold-rolled to a final gauge of 2.0 mm. The applied solution heat treatment was 550° C. for 15 min. with subsequent quenching and ageing to a T62 temper condition with 190° C. for 4 hours.

All alloys mentioned in Table 1 were subjected to various homogenization and pre-heat procedures. Examples for alloys 1 and 2 are identified within the following Tables 2 and 3:

TABLE 2

Overview of the applied homogenization and pre-heat treatment in soaking time (hour) at soaking temperature (° C.) for Alloy 1.

| Sample Code | Homogenization (time/temperature) | Pre-heat (time/temperature) | ΔH (J/g) |
|---|---|---|---|
| 1A | 6 h/550° C. | 6 h/550° C. | 0.24 |
| 1B | 18 h/550° C. | 6 h/550° C. | 0.55 |
| 1C | none | 6 h/550° C. | 0.62 |
| 1D | none | 12 h/550° C. | 0.36 |
| 1E | none | 18 h/550° C. | 0.38 |
| 1F | none | 6 h/510° C. | 1.60 |
| 1G | 6 h/510° C. | 6 h/550° C. | nil |

TABLE 3

Overview of the applied homogenization and pre-heat treatment in soaking time (hour) at soaking temperature (° C.) for Alloy 2.

| Sample Code | Homogenization (time/temperature) | Pre-heat (time/temperature) | ΔH (J/g) |
|---|---|---|---|
| 2A | 6 h/550° C. | 6 h/550° C. | 0.64 |
| 2B | 18 h/550° C. | 6 h/550° C. | 0.57 |
| 2C | none | 6 h/550° C. | 0.75 |
| 2D | none | 12 h/550° C. | 0.57 |
| 2E | none | 18 h/550° C. | 0.49 |
| 2F | none | 6 h/510° C. | 1.00 |
| 2G | 6 h/510° C. | 6 h/550° C. | 0.11 |

The non-clad rolled alloy products have been tested in the T62 temper for their tensile properties in the L-direction using small Euronorm samples wherein Rp stands for yield strength, Rm stands for ultimate tensile strength and Ag for elongation. The results are summarized in Tables 4 and 5 for both alloys:

TABLE 4

Tensile properties and intergranular corrosion behavior of Alloy 1 in T62 temper as function of the heat treatment prior to hot rolling.

| Sample Code | Tensile properties | | | Intergranular corrosion | |
|---|---|---|---|---|---|
| | Rp [MPa] | Rm [MPa] | Ag [%] | Depth [μm] | Type |
| 1A | 371 | 392 | 8.2 | 129 | P(i) |
| 1B | 363 | 374 | 8.9 | 121 | I |
| 1C | 361 | 400 | 8.7 | 92 | P(i) |
| 1D | 362 | 380 | 9.5 | 102 | P(i) |
| 1E | 366 | 383 | 9.1 | 108 | P(i) |
| 1F | 346 | 370 | 9.3 | 103 | I |
| 1G | 347 | 371 | 9.3 | 121 | P(i) |

TABLE 5

Tensile properties and intergranular corrosion behavior of Alloy 2 in T62 temper as function of the heat treatment prior to hot rolling.

| Sample Code | Tensile properties | | | Intergranular Corrosion (IGC) | |
|---|---|---|---|---|---|
| | Rp [MPa] | Rm [MPa] | Ag [%] | Depth [μm] | Type |
| 2A | 357 | 382 | 8.4 | 82 | P(i) |
| 2B | 361 | 382 | 7.7 | 114 | I |
| 2C | 358 | 384 | 8.2 | 112 | P(i) |
| 2D | 358 | 377 | 8.8 | 110 | P(i) |
| 2E | 354 | 368 | 9.1 | 93 | P(i) |
| 2F | 356 | 386 | 9.2 | 108 | I |
| 2G | 330 | 363 | 8.1 | 125 | P(i) |

As identified in Tables 2 and 3 the Delta H results are superior with regard to prior art alloys. Specifically the amount of intermetallics or low melting incipient phases is below 1.0 J/g. For obtaining the DSC parameters, a Pyris 1, Power Compensating Scanning Calorimeter apparatus was used. The samples were put in a graphite samples holder and measured in a protective nitrogen atmosphere. The heating rate was 20° C./min. The data was acquired with the Pyris Series Thermal Analysis Manager, V 3.81.

The intergranular corrosion (IGC) was measured according to MIL-H-6088 and further requirements as given in AIMS 03-04-000. Here, P is defined as pure pitting, P(i) as pitting with slight intergranular corrosion at the bottom of the pit, I as localized intergranular corrosion and I(+) as severe intergranular corrosion.

In order to identify the fatigue crack growth rate (FCGR) alloys 1C, 1D and 1G as well as 2A, 2C and 2G were tested according to ASTM E-647 on 80 mm wide panels (CCT or M(T) specimens, 80 mm wide, 2ai (start crack)=4.0 mm, R=0.1, no anti-buckling, relative humidity >40%, measurements at room temperature, frequency 5 Hz, crack length measured with pulsed DCPD, calibrated optically). The results are shown in Table 6.

TABLE 6

Fatigue crack growth rate with Delta K-level in MPa√m for Alloy 1 and Alloy 2 examples ("—" means "not measured").

| Sample Code | FCGR at $\Delta K = 15$ | FCGR at $\Delta K = 20$ | FCGR at $\Delta K = 25$ | FCGR at $\Delta K = 30$ | FCGR at $\Delta K = 35$ | FCGR at $\Delta K = 40$ |
|---|---|---|---|---|---|---|
| 1C | 0.00E+00 | 0.00E+00 | 1.56E-03 | 2.17E-03 | 3.60E-03 | 4.76E-03 |
| 1D | 4.54E-04 | 7.71E-04 | 1.17E-03 | 1.78E-03 | 2.96E-03 | 5.12E-03 |
| 1G | 4.15E-04 | 8.56E-04 | 1.24E-03 | 1.62E-03 | 2.37E-03 | 3.32E-03 |
| 2A | — | 6.90E-04 | — | 2.00E-03 | — | — |
| 2C | — | 8.10E-04 | — | 1.80E-03 | — | — |
| 2G | 4.14E-04 | 8.33E-04 | 1.28E-03 | 1.83E-03 | 3.04E-03 | 8.88E-03 |

As can be seen from Table 6 the values for the fatigue crack growth rate are below 9.0E-04 for FCGR 20 and below 9.0E-03 for FCGR 40. These alloys do also have a good strength and toughness as well as a P(i) type intergranular corrosion value and an amount of (low melting) intermetallics of less than Delta H=0.65 J/g.

FIGS. 1 to 4 show the intergranular corrosion of the four alloys identified in Table 1. FIG. 1 shows the intergranular corrosion of alloy 1 with a depth of around 90 μm as identified in Table 4. This has been achieved by an alloy according to sample code 1C with no homogenization and a pre-heating time of 6 hours and a pre-heating temperature of 550° C.

Figure 2:

FIG. 2 shows the intergranular corrosion of alloy 2 which is (according to table 5) around 110 μm, specifying an alloy of sample code 2D with no homogenization and a pre-heating treatment of 550° C. for 12 hours.

Figure 3:
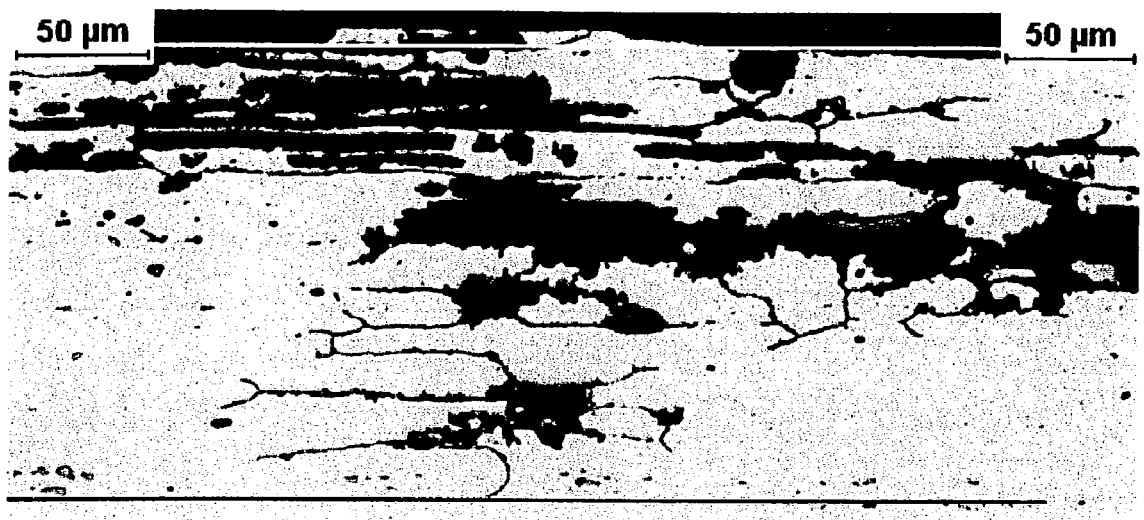
Figure 4:

FIG. 3 shows the intergranular corrosion of alloy 3 having a depth of around 180 μm while FIG. 4 shows the intergranular corrosion of alloy 4 with a depth of around 140 μm. As can be seen from such examples alloys 1 and 2 are superior to alloys 3 and 4 with regard to the intergranular corrosion properties. Here, the copper level is more than two times higher than the level of manganese and the level of magnesium is also higher than two times the level of manganese.

From the results of Table 4 and 5 it can be seen that alloys 1 and 2 have significantly less deep attack of intergranular corrosion due to an optimized chemical composition (FIGS. 1 and 2). Furthermore, it can be seen that the samples which have been subjected to a homogenization treatment prior to hot rolling but to the pre-heating step tend to have a less deep attack of intergranular corrosion. Consequently, the alloys according to the present invention do have an improved fatigue crack growth resistance and a low amount of intermetallics thereby providing a good balance of high damage tolerance characteristics and good corrosion resistance.

Having now fully described the invention, it will be apparent to one of ordinary skill in the art that many changes and modifications can be made without departing from the spirit or scope of the invention as herein described.

What is claimed is:

1. Method of producing a high-strength balanced Al—Mg—Si alloy product with an improved fatigue crack growth resistance and a low amount of intermetallics, comprising the steps of:
   a) casting an ingot with the following composition (in weight percent):

| | |
|---|---|
| Si: | 0.75–1.3 |
| Cu: | 0.6–1.1 |
| Mn: | 0.2–0.8 |
| Mg: | 0.45–0.95 |
| Fe: | 0.01–0.3 |
| Zr: | <0.25 |
| Cr: | <0.25 |
| Zn: | <0.35 |
| Ti: | <0.25 |
| V: | <0.25 |
| Hf: | <0.25 | impurities each less than 0.05 and less than 0.20 in total, balance aluminum,
   b) homogenizing the cast ingot with temperatures below 530° C., subsequently cooling with a trajectory down to a temperature below 100° C.,
   c) pre-heating the homogenized ingot after casting for 4 to 30 hours with temperatures above 530° C. and 560° C.,
   d) hot working the ingot and optionally cold working,
   e) solution heat treating, and
   f) quenching the worked product,
   wherein the amount of intermetallics or low melting incipient phases within the finally worked alloy product, according to the measured specific energy Delta H associated with the DSC signal, is below 1.5 J/g.

2. Method according to claim 1, wherein the amount of intermetallics or low melting incipient phases within the finally worked alloy product, according to the measured specific energy Delta H associated with the DSC signal, is below 1.0 J/g.

3. Method according to claim 1, wherein the amount of intermetallics or low melting incipient phases within the finally worked alloy product, according to the measured specific energy Delta H associated with the DSC signal, is below 0.65 J/g.

4. Method according to claim 1, wherein the Mg/Si-ratio is in a range between 0.8 and 1.375.

5. Method according to claim 1, wherein the amount (in weight %) of Si is in the range of 0.8 to 1.1 and of Mg in the range of 0.8 to 0.95.

6. Method according to claim 1, wherein Si is in the range of 0.79 to 0.92 wt. %.

7. Method according to claim 1, wherein the amount (in weight %) of Cu is in the range of 0.7 to 1.0.

8. Method as claimed in claim 1, wherein the amount (in weight %) of Cu is in the range of 0.75 to 0.90.

9. Method according to claim 1, wherein the amount (in weight %) of Mn is in the range of 0.2 to 0.6.

10. Method according to claim 1, wherein the amount (in weight %) of Mn is in the range of 0.30 to 0.40.

11. Method according to claim 1, wherein after quenching the worked product in step f) the worked product is aged to a T4 and/or T6 temper condition.

12. Method according to claim 1, wherein after quenching the worked product in step f) the worked product is aged to a T4 and/or T6 temper condition with temperatures of approximately 160° C. to 200° C. for 1 to 16 hours.

13. Method according to claim 1, wherein after quenching in step f) the worked product is being ageing to a T62 temper condition.

14. Method according to claim 1, wherein during the d) the ingot is hot-worked by means of rolling.

15. Method according to claim 1, wherein during the d) the ingot is cold-worked by means of rolling.

16. Method according to claim 1, wherein the amounts (in weight %) of Mn are balanced with regard to the amounts of Cu and Mg, such as Cu>1.8×Mn, and/or Mg>2.0×Mn.

17. Method according to claim 1, wherein the amounts (in weight %) of Mn are balanced with regard to the amounts of Cu and Mg, such as Cu>2.25×Mn, and/or Mg>2.2×Mn.

18. Method according to claim 1, wherein the amount (in weight %) of Zn is less than 0.2.

19. Method according to claim 1, wherein the amount (in weight %) of Fe is in the range of 0.01 to 0.25.

20. Method according to claim 1, wherein the amount (in weight %) of Fe is in the range of 0.01 to 0.20.

21. Method according to claim 1, wherein the amount (in weight %) of Ti is in the range of 0.06 to 0.20.

22. Method according to claim 1, wherein the amount (in weight %) of Ti is in the range of 0.07 to 0.16.

23. Method of manufacturing aircraft skin material comprising the method of claim 1.

24. Method of manufacturing aircraft fuselage skin material comprising the method of claim 1.

25. Method according to claim 1, wherein the method produces a rolled product with a thickness up to 15 mm.

26. Method according to claim 1, wherein the method produces a rolled product with a thickness in the range of 12 to 15 mm.

27. Method according to claim 1, wherein the product has a cladding on at least at one side.

28. Method according to claim 1, wherein the product has a cladding thereon of one of the following:
 a) a sacrificial Al-alloy with an electrochemical potential which is lower than that of the core layer,
 b) a protective Al-alloy with an electrochemical potential which is higher than that of the core layer
 c) an alloy of the Aluminum Association AA1000 series,
 d) an alloy of the Aluminum Association AA4000 series,
 e) an alloy of the Aluminum Association AA6000 series, or
 f) an alloy of the Aluminum Association AA7000 series.

29. Method according to claim 1, wherein said pre-heating is performed for 6 to 18 hours with temperatures between 530° C. and 560° C.

30. Method according to claim 1, wherein cooling trajectory is down to room temperature.

31. Method according to claim 1, wherein after quenching the worked product in step f) the worked product is aged to a T4 temper condition.

32. Method according to claim 1, wherein after quenching the worked product in step f) the worked product is aged to a T4 temper condition with temperatures of approximately 160° C. to 200° C. for 1 to 16 hours.

33. Method according to claim 1, wherein the pre-heating is performed for 8–10 hours at a temperature of 550° C.

34. Method according to claim 1, wherein after quenching the worked product in step f) the worked product is aged to a T6 temper condition.

35. Method according to claim 1, wherein after quenching the worked product in step f) the worked product is aged to a T6 temper condition with temperatures of approximately 160° C. to 200° C. for 1 to 16 hours.

* * * * *